US007532713B2

(12) United States Patent
Norton (10) Patent No.: US 7,532,713 B2
(45) Date of Patent: *May 12, 2009

(54) SYSTEM AND METHOD FOR VOICE OVER INTERNET PROTOCOL AUDIO CONFERENCING

(75) Inventor: Gerald Norton, Hoboken, NJ (US)

(73) Assignee: Vapps LLC, Hoboken, NJ (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/233,482

(22) Filed: Sep. 23, 2005

(65) Prior Publication Data

US 2006/0104221 A1 May 18, 2006

Related U.S. Application Data

(60) Provisional application No. 60/612,229, filed on Sep. 23, 2004.

(51) Int. Cl.
*H04M 3/42* (2006.01)
(52) U.S. Cl. .................. 379/202.01; 370/261; 709/204; 709/227; 715/753
(58) Field of Classification Search ............ 379/202.01; 370/261; 709/204, 227; 715/753
See application file for complete search history.

(56) References Cited

U.S. PATENT DOCUMENTS

| | | | |
|---|---|---|---|
| 5,479,498 A | 12/1995 | Brandman et al. | |
| 6,178,237 B1 | 1/2001 | Horn | |
| 6,393,112 B1 | 5/2002 | Gottlieb et al. | |
| 6,463,414 B1 | 10/2002 | Su et al. | |
| 6,564,049 B1 * | 5/2003 | Dailey ........................ | 455/416 |
| 6,714,635 B1 | 3/2004 | Adams et al. | |
| 6,744,741 B1 * | 6/2004 | Ju et al. ...................... | 370/260 |
| 6,961,416 B1 | 11/2005 | Summers et al. | |
| 7,023,465 B2 | 4/2006 | Stephens, Jr. | |
| 7,062,025 B2 | 6/2006 | Summers et al. | |
| 7,107,312 B2 | 9/2006 | Hackbarth et al. | |
| 7,113,580 B1 | 9/2006 | DellaMorte, Sr. et al. | |
| 7,218,711 B2 * | 5/2007 | Pines et al. ............. | 379/114.01 |
| 7,236,580 B1 | 6/2007 | Sarkar et al. | |
| 2003/0002448 A1 | 1/2003 | Laursen et al. | |
| 2003/0021400 A1 | 1/2003 | Grandgent et al. | |
| 2003/0035381 A1 * | 2/2003 | Chen et al. .................. | 370/261 |
| 2005/0289471 A1 | 12/2005 | Thompson et al. | |
| 2006/0050658 A1 | 3/2006 | Shaffer et al. | |

(Continued)

FOREIGN PATENT DOCUMENTS

WO        WO 01/33826 A1    5/2001

OTHER PUBLICATIONS

MeetingPlace IP sales brochure, Latitude Communications, Inc.

(Continued)

*Primary Examiner*—Quynh H Nguyen
(74) *Attorney, Agent, or Firm*—Paul Davis; Goodwin Procter LLP (57) ABSTRACT

An embodiment of a conference bridge adapted for voice-over-IP applications has a modular, scalable architecture and establishes and internally relocates conference calls using SIP protocol commands for efficient processing. Further embodiments of the conference bridge support a plurality of conference access numbers. Dialed Number Identification Service groups may be programmed to selectively vary functions of the conference bridge depending on the DNIS identification of the called number.

6 Claims, 10 Drawing Sheets

U.S. PATENT DOCUMENTS

2007/0217589 A1 9/2007 Martin et al.
2007/0253557 A1 11/2007 Song et al.
2007/0253558 A1 11/2007 Song et al.
2008/0037749 A1 2/2008 Metzger et al.

OTHER PUBLICATIONS

Voyant™ ReadiVoice™ sales brochure, Voyant Technologies, Inc.

* cited by examiner

SYSTEM AND METHOD FOR VOICE OVER INTERNET PROTOCOL AUDIO CONFERENCING

CROSS-REFERENCE TO RELATED APPLICATIONS

This application claims priority of U.S. Provisional Application Ser. No. 60/612,229 filed Sep. 23, 2004, titled "System and Method for Voice Over Internet Protocol Audio Conferencing." The entire disclosure of this provisional application, including the appendices thereof, is incorporated herein by reference.

COMPUTER PROGRAM LISTING APPENDIX

This specification includes a computer program listing appendix on a single CD-ROM, submitted in duplicate, which constitutes a part of the specification and is incorporated herein by reference. The computer program listing appendix has three files, Boardconfig.txt (4 kb), CB1000admin.txt (60 kb), and CB1000utility.txt (113 kb). Each file has a creation date of Sep. 23, 2005. The material in this disc is subject to copyright protection. The copyright owner has no objection to the facsimile reproduction by anyone of the patent document or the patent disclosure, as it appears in the Patent and Trademark Office files and records and as allowed by PTO rules, but otherwise reserves all copyright rights whatsoever.

BACKGROUND OF THE INVENTION

The architecture of telephone networks is currently undergoing a fundamental transformation. Voice-over-IP or "VoIP" solutions are being integrated into different pieces of the transport layer because they enable significant cost savings on behalf of the carriers implementing them. Once the phone carrier has established traffic in IP format and is able to deliver it to his customers, there is a need for new, enhanced services in processing this IP-format phone traffic.

One such application is conference calling. Much as in traditional TDM-based networks, IP-based conference calling enables multiple users to call into a single number and be placed in a multi-person call. A "conference bridge" provides conference call setup capability.

Early conference bridge designs did not take into account the unique nature of IP-based voice traffic and did not provide an ability to seamlessly move calls between systems. Further, prior art conference bridges did not provide a mechanism for responding in a different manner to calls based on the line on which the call is received.

The inventor has determined that there are various unmet needs for conference bridge systems in a voice-over-IP environment.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In an exemplary embodiment, a Voice over Internet Protocol conference bridge and a method of operating the same are provided to enable calls transported in Voice over Internet Protocol ("VoIP") to be answered by the conference bridge, which identifies the caller as a conference participant and routes the call to the correct DSP resource for processing. In some embodiments, calls may be seamlessly moved around within the DSP resources as capacity becomes enabled or disabled. Also, in certain embodiments, a conference bridge is provided with the capacity to support a plurality of dial-in numbers and particularly to respond in a different programmed manner to calls received on different dial-in numbers. As one example, prompts and instructions for the different dial-in numbers may be provided in different languages depending on the number called by the conference participant.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

The present invention will now be described with reference to the accompanying drawings. In the drawings, some like reference numbers indicate identical or functionally similar elements. Additionally, the left-most digit(s) of most reference numbers may identify the drawing in which the reference numbers first appear.

DETAILED DESCRIPTION OF THE PREFERRED EMBODIMENTS

The present invention will now be explained in terms of exemplary embodiments. This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in PDAs, mobile telephones, and other portable devices; magnetic disk storage media; optical storage media; flash memory devices; electrical, optical, acoustical, or other forms of propagated signals (e.g. carrier waves, infrared signals, digital signals, analog signals, etc.), and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Figure 1A:
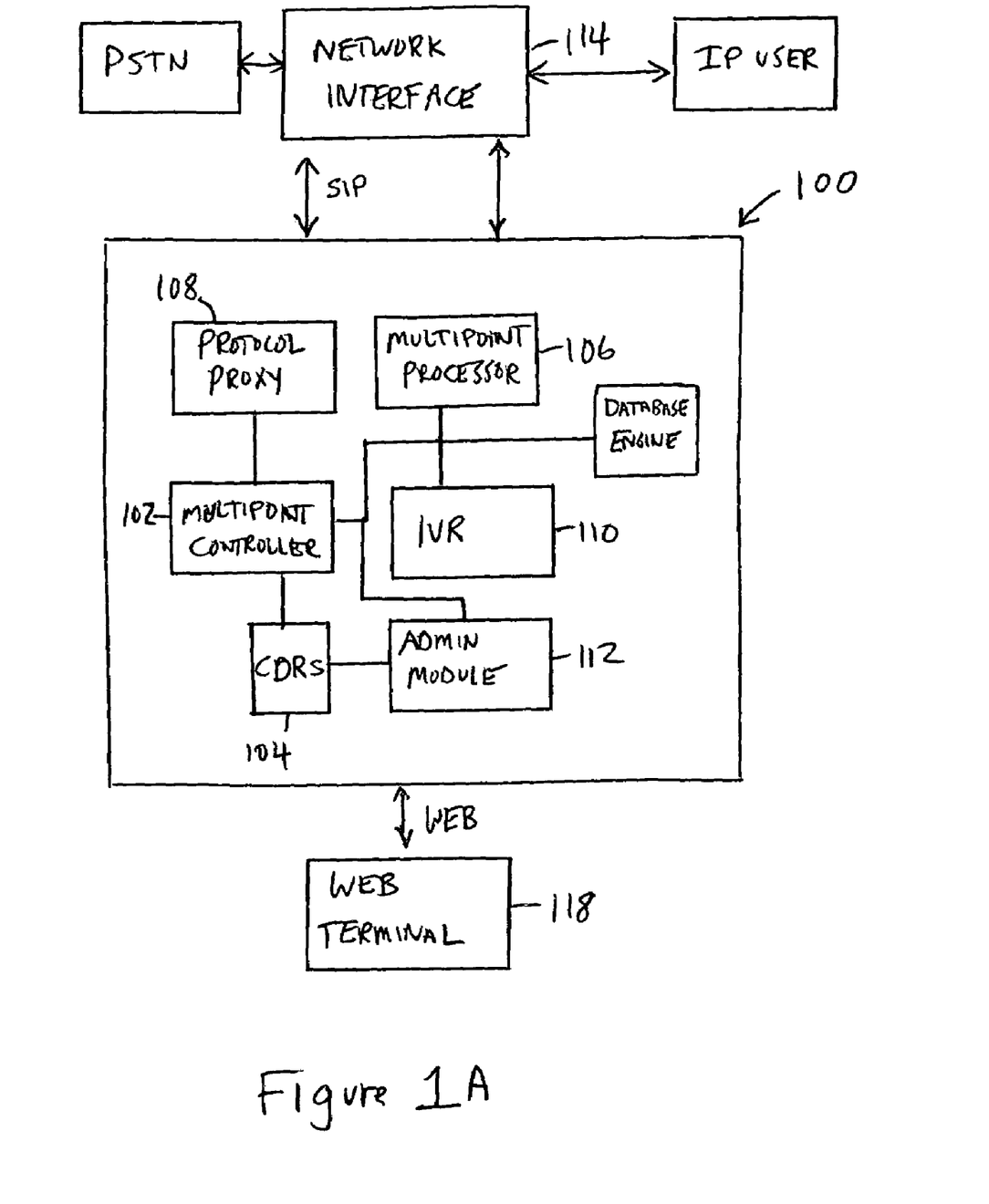
FIG. 1a is a block diagram showing software and hardware components of one exemplary embodiment.

Referring first to FIG. 1A, an exemplary embodiment provides a novel conference bridge architecture. As shown in FIG. 1A, a conference bridge unit 100 incorporates a protocol proxy server 108, a multipoint controller 102, a CDR 104, a multipoint processor 106, an IVR (interactive voice response) device 110, and an administrative module 112. In the embodiment shown, conference bridge unit 100 operates to receive calls from conference participants, and to connect those calls to provide conference facilities to the conference participants.

In addition to this novel hardware arrangement, in an exemplary embodiment, novel methods of operating such conference bridge systems are provided. In an embodiment, conference bridge 100 incorporates a network interface 114 which may include a public switched telephone network interface and/or an IP user interface and may carry SIP commands. A web terminal interface 116 is preferably provided for administration of the system.

Figure 1B:
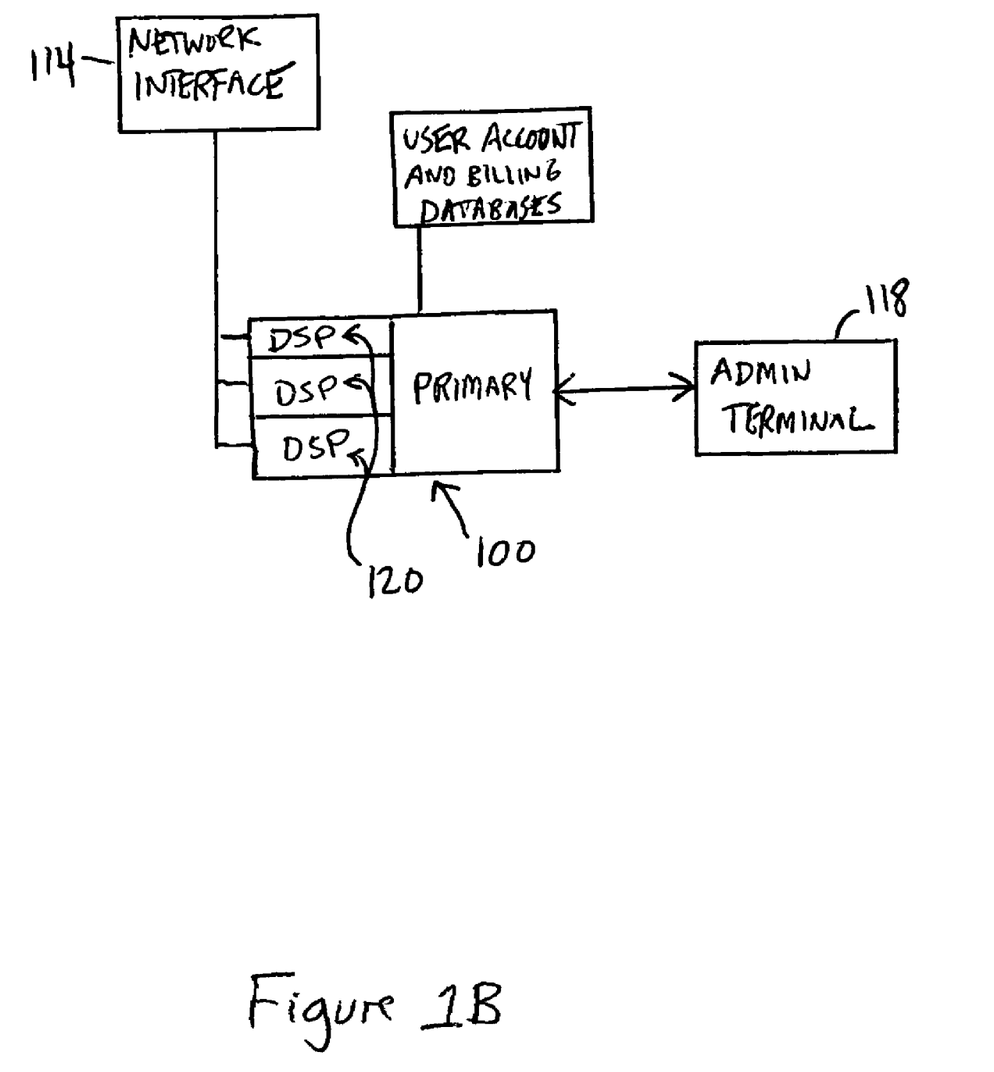
FIG. 1b is a block schematic diagram of a single housing embodiment.
Figure 1C:
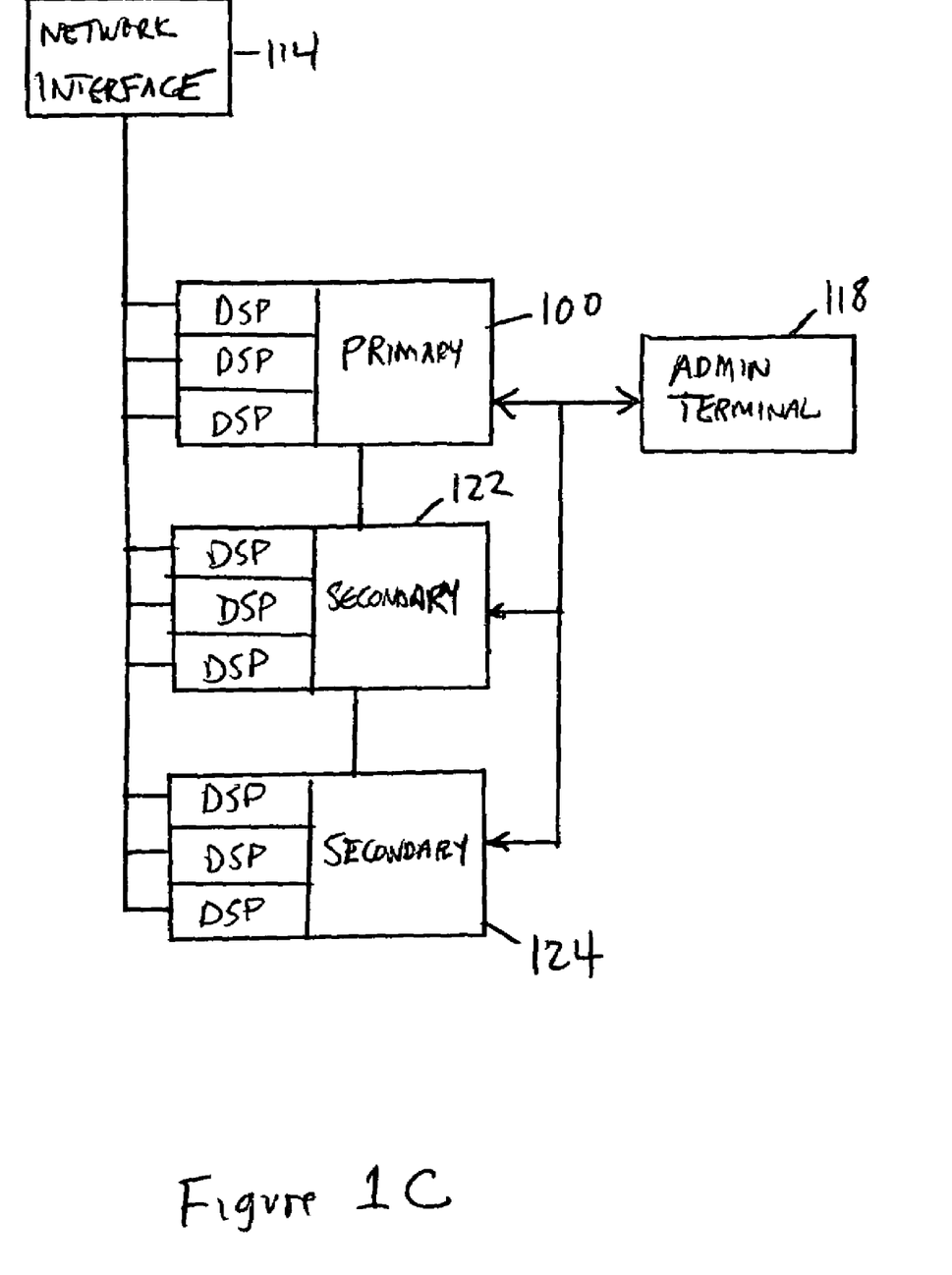
FIG. 1c is a block schematic diagram of a multiple-housing embodiment.

In an embodiment, as shown in FIG. 1B, control and bridging software is configured to span multiple DSP boards 120 installed within conference bridge 100. These boards 120 may be located in a single housing 100 as shown in FIG. 1B, or in two or more housings as desired, depending on the number of calls to be served by the system. An embodiment with three housings 100, 122, and 124 is shown in FIG. 1C. DSP boards 120 are available from a variety of manufacturers. As one example, a conference bridge 100 may be made up of one or more CG6500 DSP boards 120 manufactured by Natural Micro Systems of Framingham, Mass. In the exemplary embodiments, these boards are connected together in housings 100, 122, and 124 by a cPCI backplane which may be part of a general purpose PC computing device located in the housing to drive, control, and serve the DSP boards 120. These DSP boards 120 are preferably controlled by novel software and firmware operating in the PC computing system, the DSP boards 120, or both. This software and firmware implements features of the invention as described herein, and as shown and described in the computer program listing appendix which forms a part of this specification. The resulting architecture allows the connection of one or more modular chassis exemplified by conference bridges 100, 122, and 124 to form a conference bridge system with a greater capacity as desired. In a preferred embodiment, the boards are controlled by a custom configuration program. Source code for an exemplary configuration program is included in the computer program listing appendix.

Preferably, the software and firmware of conference bridge 100 controls call routing operations using commands derived from the Session Initiation Protocol (SIP) used for Internet communications. Depending on the desired features, any or all of the available SIP commands may be implemented, in any desired combination. SIP is an Internet standard and information on SIP is available to those skilled in the relevant art. It will be understood that the invention contemplates that all or a subset of these features may be utilized, and that the invention is not limited to the present SIP command set but may implement future enhancements and modifications to SIP as they are developed.

The following configurations are presented as non-limiting examples to illuminate how the software uses these multiple resources to provide efficient mixing and call control for the conference participants. In a first embodiment, one chassis or housing with one or more DSP boards is used to provide all required functions. The housing may be designed, for example, in the manner shown in FIG. 1B. In this embodiment, all conferences and SIP calls are located on the same computing device. SIP signaling and media processing are performed within the same device.

In another embodiment, shown in FIG. 1C, a plurality of housings are provided. One housing or chassis 100 (designated as the primary) is used for the bulk of SIP control and signaling processes and one or more housings 122, 124 (the secondary housings) are primarily assigned media processing tasks. Preferably, all SIP call control and signaling tasks are performed on the primary chassis while the media processing is allocated between the primary and the secondary chassis by software operating in the primary chassis.

Scalability and robustness are two key issues that may be addressed by architectural choices in implementing the concepts disclosed herein. In order to achieve scalability the system can be implemented with none, one, or many secondary chassis. The software is preferably designed to be reconfigurable during operation so that additional chassis can be added or removed in run-time without interruption of normal operations. Also, it is desirable though not required that the software implement a feature where one or more of the secondary chassis is designated to take over as the primary in case of a physical failure of the primary.

Figure 2A:
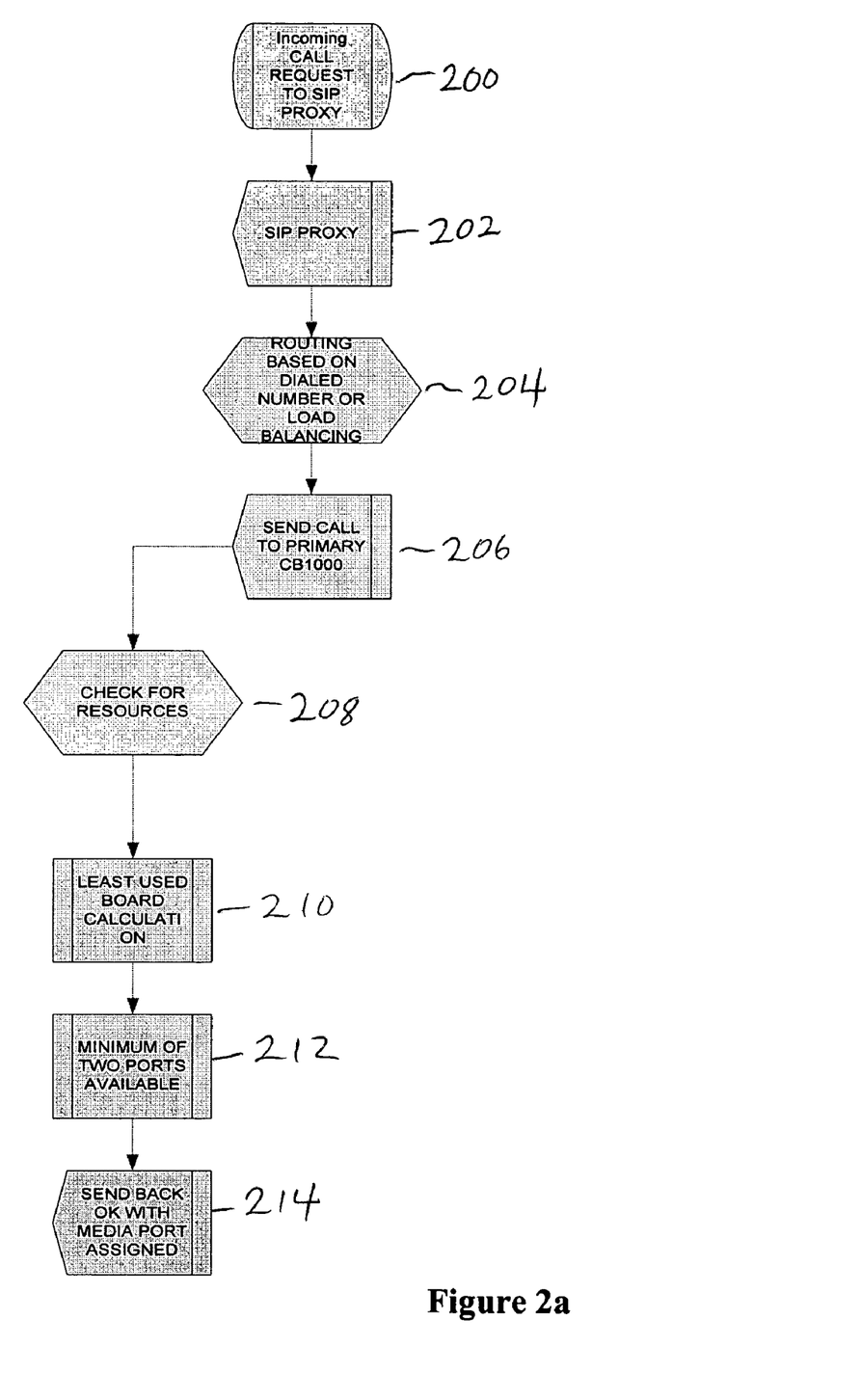
FIGS. 2a and 2b comprise a flow chart showing a call set up process used in one exemplary embodiment.
Figure 2B:
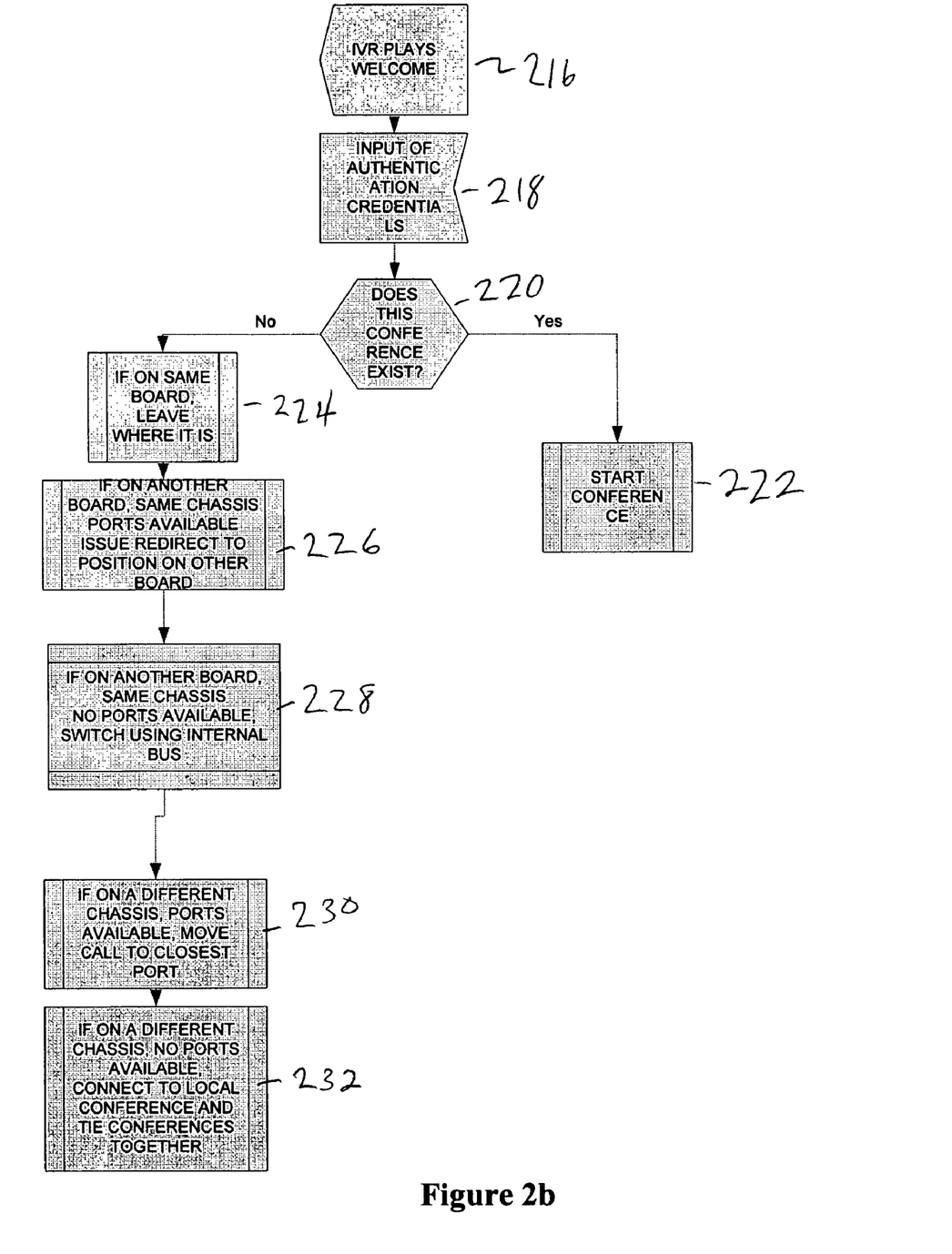

Operation of the conference bridge to establish and route calls may occur, for example, based on the flowcharts of FIG. 2a and FIG. 2b. As shown in FIG. 2a, an incoming call request reaches a SIP proxy server in the conference bridge in step 200.

To enhance convenience and consistency of operation of the system, preferably, the conference bridge is configured to operate primarily with Voice-over-IP signals; persons calling in from the PSTN network will have their calls converted to VoIP by a gateway so that all calls in a conference have a consistent data format. Basic VoIP gateway functionality used to perform this function is known to those skilled in the art and will not be described in further detail herein.

In step 202 the SIP proxy server operates to receive data describing the incoming call, which may include Dialed Number Identification Service (DNIS) provided by the telephone network. The DNIS is the counterpart of the Automatic Number Identification (ANI) service, which similarly provides the number from which the caller placed the call. In step 204 the call is routed based on a dialed number (for example, obtained from the DNIS) indicating the number dialed by the caller to reach the conference bridge, and/or based on load balancing goals.

As an example, the call may go to a primary conference bridge in step 206. The system also makes a novel use of the form of the SIP Invite message that is received from a conference participant to check for instant validation credentials present in the Invite. The SIP Invite message includes "to" and "from" addresses. One portion of the "to" address is known as a "User part" in the SIP protocol. In a specific embodiment, the "user part" of the SIP Invite message may be set to the value of the conference ID, and the "user portion" of the "from" address may be set to match the PIN number selected by the Moderator for the conference. Thus, an incoming call with the SIP Invite message formatted to contain data in this manner can be validated and placed into the proper conference without any further interaction or data entry by the user.

The system then uses this information in Step 208. In step 208, the system checks for resources to carry the conference call on the various boards. Credentials supplied with the SIP Invite allow the system to skip these steps and go to step 220. In step 210, a "least used board calculation" is performed. This calculation measures current usage of each board and determines which of the available boards has the most capacity. The system determines whether there are at least two ports available in step 212, and in step 214, assuming that there are ports available, the system indicates an "OK" and assigns media port(s). Preferably the ports are assigned on the same board.

Referring to FIG. 2b, in step 216 an interactive voice response (IVR) module provides a welcome message to the caller. The welcome message is provided by playing a selected digital file, such as a .wav file. The welcome message may therefore be provided in any desired language and may be provided with appropriate content depending on the purpose and manner of operation of the conference center. In step 218 the user inputs authentication credentials, such as a password or conference call code, to the extent these were not encoded into the SIP Invite message in the manner described above. In step 220 the system determines whether the requested conference already exists. If so, the conference is started in step 222. As shown in step 224, if the conference is not yet active and the conference will be on the same board, the incoming call is not rerouted. In step 226, if the conference call is on another board, and the same chassis ports are available, the system issues a SIP command to redirect the media portion of the call to a position on the board carrying the other conference participants. In step 228, if the conference call is on another board in the same chassis, without available ports, the call is switched using the internal bus.

In step 230, if the conference call is on a different chassis and ports are available, the call is moved to the closest port. Finally, in step 232, if the call is on a different chassis and no ports are available on that chassis, the call is connected to a conference in the local chassis and the conferences in the two chassis are tied together.

An exemplary conference call process may therefore include the following steps.

1. SIP call reaches Sip Proxy server

2. SIP proxy server places incoming call on the primary chassis. It forwards the Invite according to SIP standard protocols.

3. The login script starts on the primary chassis. The purpose of the script is to identify on which chassis the requested conference is located. The primary chassis assigns an IP/port and instructs the DSP resource board (located on the primary) to connect and begin IVR.

3a. The Invite message is examined for inclusion of credentials for authentication, allowing the system to bypass the use of IVR.

4. System authenticates and assigns user to the selected correct chassis. In order to redirect the media traffic the system uses a SIP Re-Invite. Note: the SIP call information is stored on the primary while the media traffic is redirected. After re-Invite the client will be sending media to an IP/port located on the one of the available chassis.

If there are free resources in the primary chassis, the conference may start there.

In an embodiment, an H.100/H.110 protocol is implemented to connect boards within each chassis. This protocol is known to those skilled in the art and will not be described in further detail. It will be understood that the invention is not limited to this embodiment; other board communications protocols, known and yet to be developed, may be implemented within the scope of the invention.

If a conference has exhausted all resources available on the certain chassis the system must organize a daisy chain to another available chassis. However, since this procedure is resource consuming, in a preferred embodiment, a load balancing algorithm is implemented to reduce the probability of the need for daisy chaining.

In a preferred embodiment, systems supporting multiple boards 120 will have the following characteristics. Participants of one conference can be located on any board within the chassis. However the load balancing algorithm attempts to locate participants of one conference closer to each other in order to save H.100/H.110 bandwidth. In the worst case participants of one conference can be located on multiple chassis. In this case the system connects one chassis to the next.

Preferably, the primary chassis 100 is able to dynamically turn on/off certain chassis such as secondary chassis 122 and 124 without restarting the whole system. Similarly, in a preferred embodiment the primary chassis 100 (and the secondary chassis 122 and 124) are able to dynamically turn on/off selected boards 120 without restarting the whole chassis 100, 122 or 124.

The software preferably performs load balancing in the following areas: What chassis to use for the next media stream, what board within that chassis to assign to the next media stream, and what chassis to assign the next conference. In addition, the system mirrors data to a backup location (in case of failure of the primary).

Figure 3A:
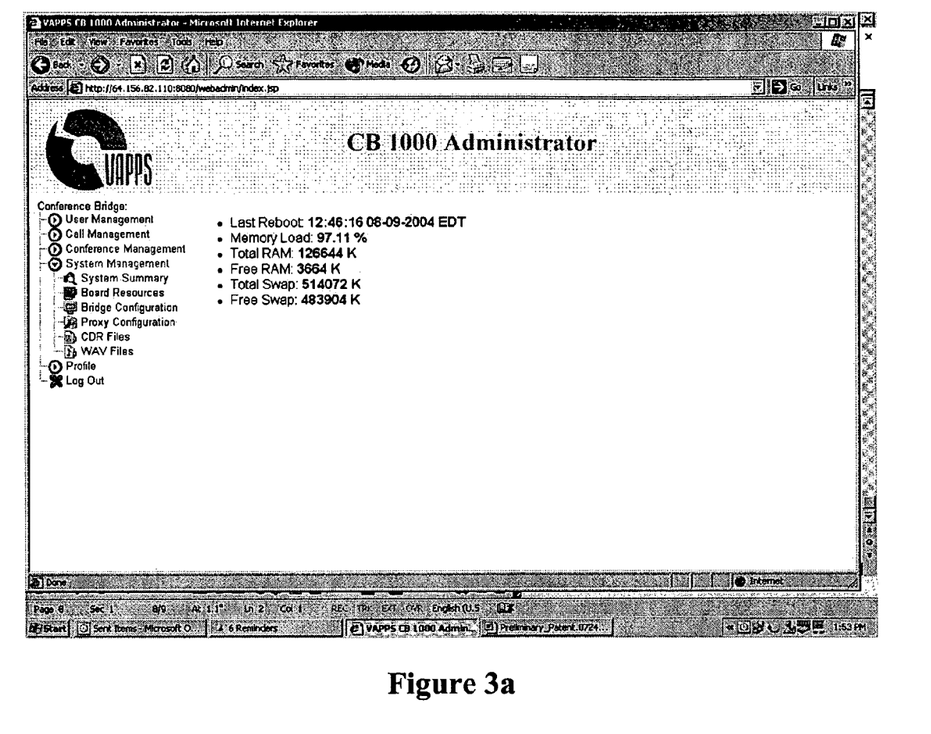
FIGS. 3a through 3c show screen displays associated with an administrator interface provided in one exemplary embodiment.
Figure 3B:
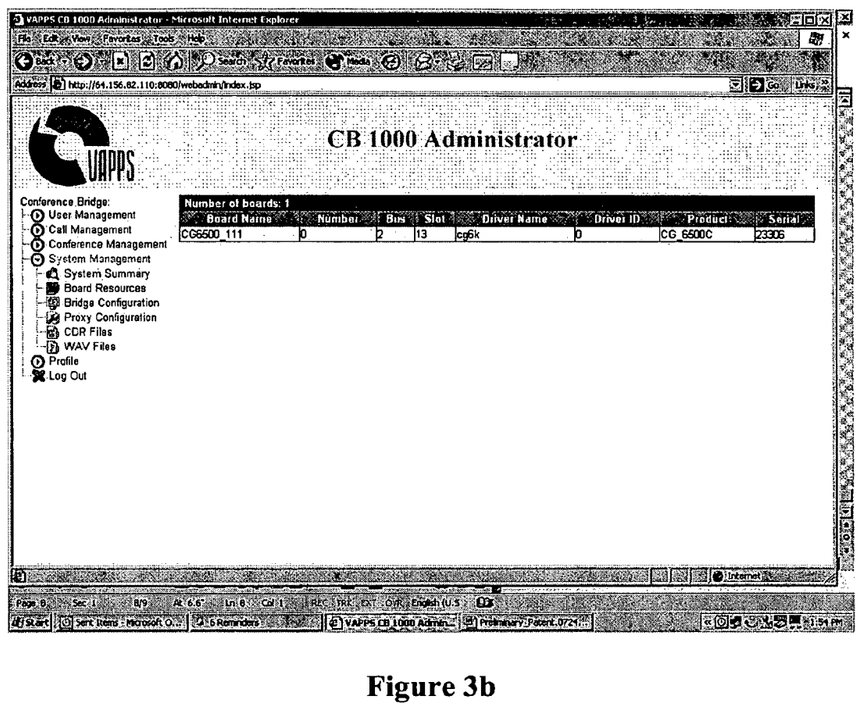
Figure 3C:
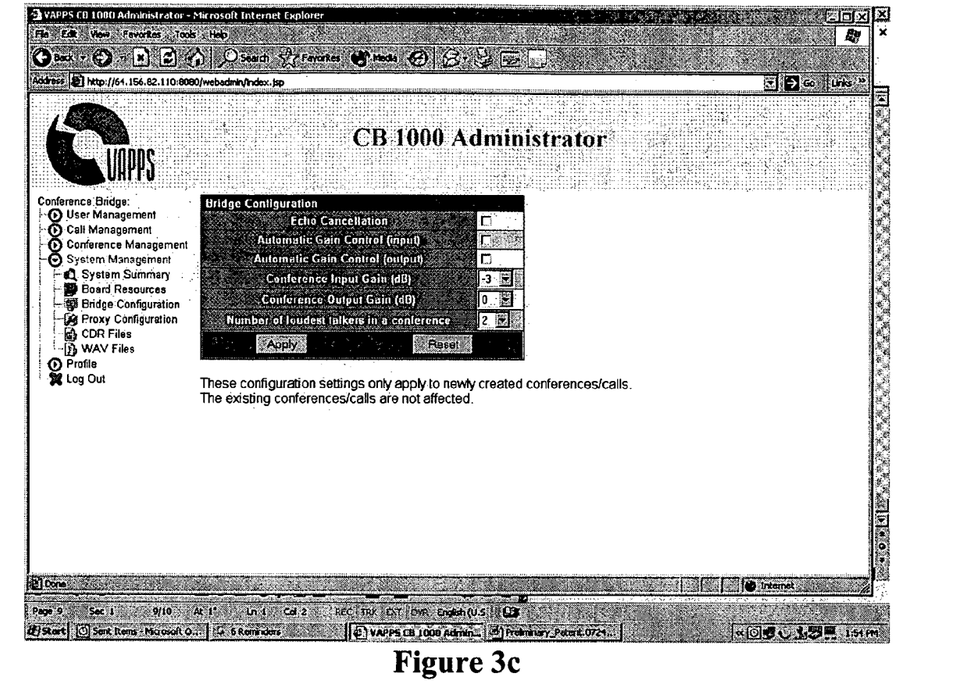

Preferably, the administrator is able to control the entire system via a browser based interface. This interface enables the administrator to monitor the system resources, add and remove DSP capacity and make revisions to the DSP usage patterns. FIGS. 3a through 3c show exemplary administrator display screens. Exemplary administrative functions performed by the system are disclosed in more detail in the software listing appendix.

From a web terminal 118 connected to conference bridge 100, the administrator is able to see how many boards 120 are available on each chassis 100, 122 and 124, how many total ports are on each board 120, how many free ports are currently on each board 120, and the configuration of each board 120, among other features.

This arrangement allows for the creation and connection of a call log from the conference to an internal or external recording service. In an embodiment, this recording service consists of a SIP User Agent and novel software to receive and record streaming conference output without converting it back to an analog signal.

Figure 4:
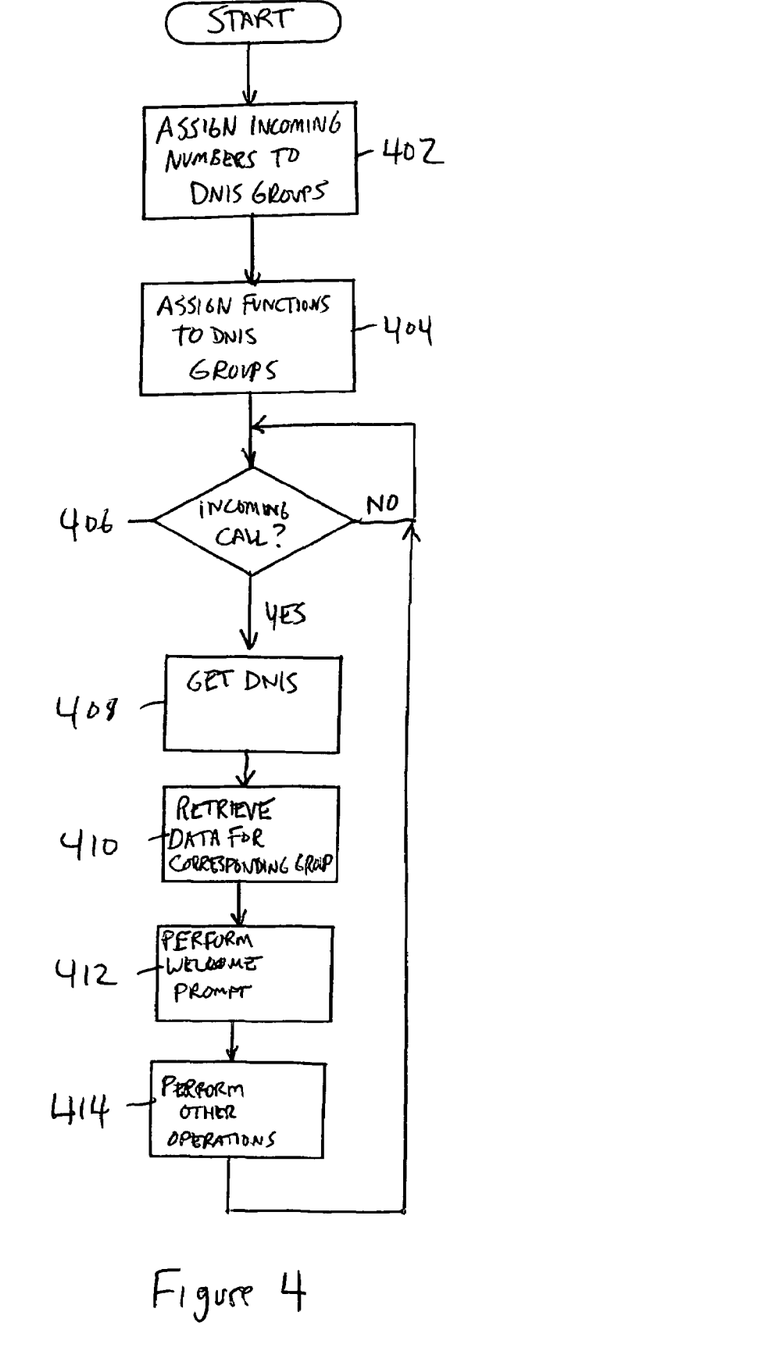
FIG. 4 is a flow chart illustrating an exemplary DNIS mapping process.

FIG. 4 is a flow chart illustrating one embodiment of a feature where the conference bridge supports a plurality of incoming conference call lines, and incoming calls receive different processing based on the line that was called. In step 402, the system is configured by assigning each of the incoming call lines to a DNIS group. Each line may have its own group, or two or more lines can be put in the same group.

The terms "dial," "dialed," "dialing" and the like are used herein to broadly describe the process of establishing an information transfer connection, regardless of the particular method used to establish that connection. Those skilled in the art will recognize that the term "dial" originally described the manual actuation of a rotary mechanical switch in early PSTN telephony equipment, but this term has been retained in common use and is now also used to encompass more modern call placement mechanisms, such as tone dialing and the generation of electronic call placement signals in a computer or IP-based telephony environment. The applicant uses the term "dial" and its derivatives in the broadest possible sense.

In step 404, functions are assigned to the DNIS groups. Incoming calls on lines within a configured DNIS group will be processed in a manner defined by the assigned functions and configurations for that group. For example, each group is preferably assigned to an operator and has an established call flow that defines messages, scripts, and processing to be done on calls arriving through the lines assigned to that group. One or more unique welcome prompts may be assigned to each DNIS group, such as a .wav file to be played upon receiving a call. The ability to configure different responses and processes for different incoming lines makes operation of the system more robust and flexible.

For example, different groups of lines can be configured for different languages, i.e. there may be an English DNIS group, a Spanish DNIS group, a German DNIS group, etc. in order to conveniently serve a range of international customers. Different groups of lines may also be configured for the specific needs of regular conference customers. In another embodiment, operators of the system can use the DNIS group function to provide privately branded conference service capability. One or more specific call-in numbers may be assigned to a client, and those numbers can be answered with a custom welcome message such as "Welcome to the Blank Rome telephone conference center." Operating scripts, call set up processes, and billing features may also be customized for that client's needs using the DNIS group architecture.

In step 406, the process determines whether an incoming call has been received. When a call is received, control passes to step 408, and DNIS information for the incoming call is retrieved from the network.

In step 410, operating configuration data for the corresponding DNIS group is retrieved. Then, in step 412, the welcome prompt assigned to that DNIS group is played. In step 414, additional programmed operations are performed depending on the scripts and programming established for the DNIS group that received the call.

Figure 5:
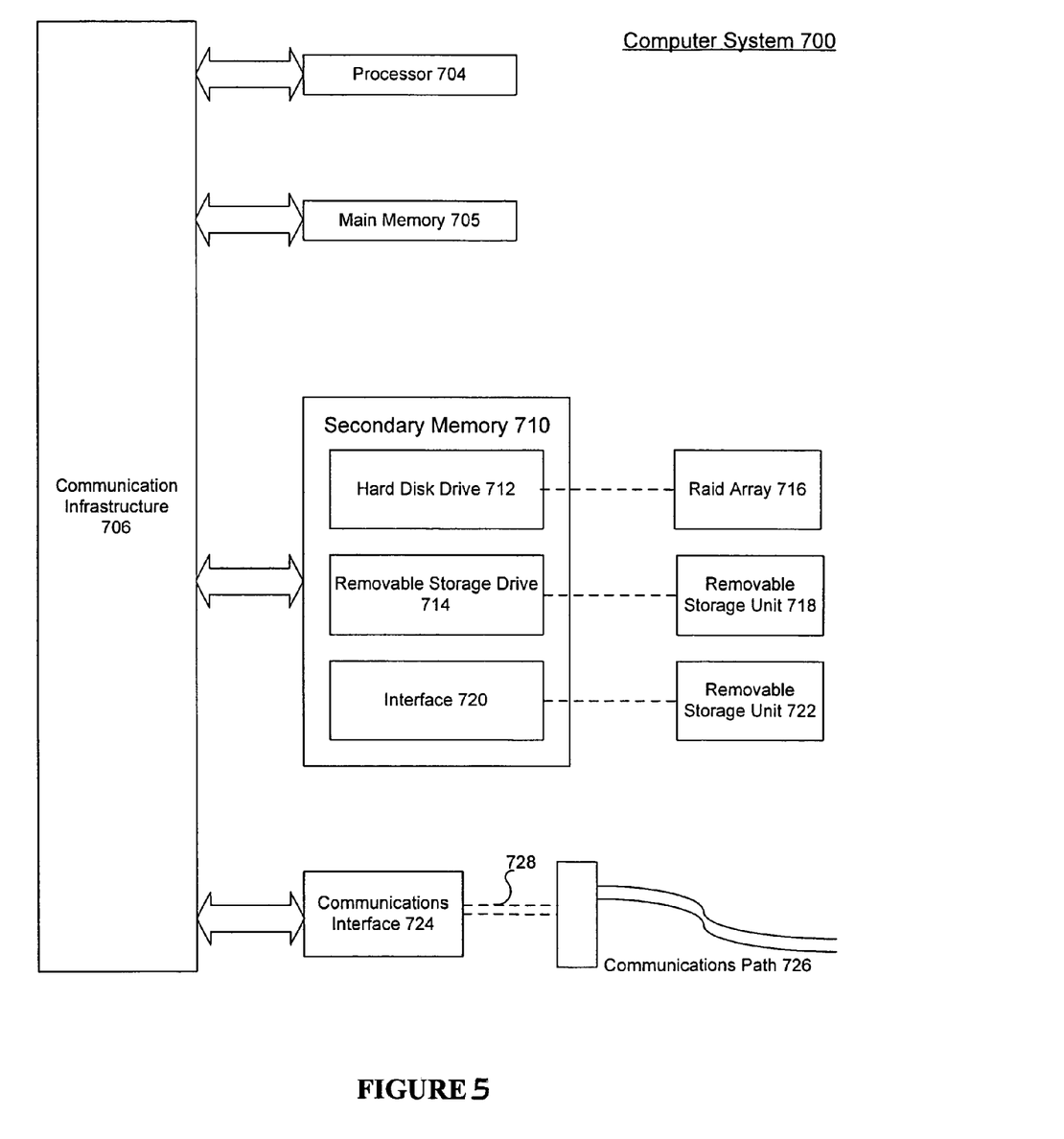
FIG. 5 is a block schematic diagram of a general purpose PC computer system that may be incorporated in a conference bridge.

The following description of a general purpose computer system, such as a PC system, is provided for completeness. The present invention can be implemented in hardware, or as a combination of software and hardware. Consequently, the invention may be implemented in the environment of a computer system or other processing system. An example of such a computer system 700 is shown in FIG. 5. The computer system 700 includes one or more processors, such as processor 704. Processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

The terms "computer program medium" and "computer usable medium" are used herein to generally refer to media such as removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the processes of the present invention. Where the invention is implemented using software, the software may be stored in a computer program product and loaded into computer system 700 using raid array 716, removable storage drive 714, hard drive 712 or communications interface 724.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the claims and their equivalents.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A conference bridge, comprising:
at least first and second digital signal processing circuits adapted to process voice signals in an internet protocol format;
a network interface circuit connected to the first and second digital signal processing circuits, adapted for connection to a data network, and capable of transmitting and receiving voice over internet protocol (VoIP) signals between the data network and the first digital signal processing circuit;
a control circuit that dynamically transfers calls between the first and second digital signal processing circuits;
a plurality of call-in numbers associated with the conference bridge to facilitate connection by a conferee to one of said call-in numbers to participate in a conference carried by the conference bridge;
data storage that stores one or more sets of call handling parameter defining information and associates at least one of the sets of parameter defining information with a grouping of one or more of said call-in numbers; and
one or more processing mechanisms associated with the first and second digital signal processing circuits and the data storage, operating to detect a received call, obtain information identifying the call-in number dialed by the conferee, identify the grouping to which the dialed call-in number belongs, retrieve from the data storage the call handling parameter defining information corresponding to the identified grouping, and processing the call according to said retrieved call handling parameter defining information;
wherein the control circuit automatically transfers calls between the first and second digital signal processing circuits to consolidate calls in a single conference onto the same digital signal processing circuit.

2. The conference bridge of claim 1, wherein the call handling parameter defining information includes information defining a welcome message to be played for calls received on that grouping of call-in numbers.

3. The conference bridge of claim 2, wherein the call handling parameter defining information further includes information defining a processing script for the call.

4. A method for operating a conference bridge, comprising:
providing a plurality of independently functional digital signal processing circuits adapted to process voice signals in an internet protocol format;
connecting the digital signal processing circuits to a data network for transmission of voice over internet protocol (VoIP) signals between the data network and the digital signal processing circuits;
dynamically transferring calls between the first and second digital signal processing circuits to form conferences;
automatically transferring calls between at least two of the plurality of digital signal processing circuits to consolidate calls in a single conference onto the same digital signal processing circuit;
consolidate calls in a single conference onto the same digital signal processing circuit;
defining, in one or more processing mechanisms, a plurality of call-in numbers associated with the conference bridge that can be dialed by a conferee to access a conference in Internet protocol format carried by the conference bridge;
defining and storing, in a data storage, one or more sets of call handling parameter defining information and associating at least one of said sets with a grouping of one or more of said call-in numbers;
detecting a received call in said one or more processing mechanisms;
obtaining information identifying the call-in number dialed by the conferee in said one or more processing mechanisms;
identifying the grouping to which the dialed call-in number belongs in said one or more processing mechanisms;
retrieving from said data storage the call handling parameter defining information corresponding to the identified grouping; and
processing the call in said one or more processing mechanisms according to said retrieved call handling parameter defining information associated with the particular call-in number.

5. The method of claim 4, including the further step of defining a distinct welcome message to be played for calls received on a grouping of call-in numbers.

6. The method of claim 5, including the further step of defining a processing script to be followed for calls received on a grouping of call-in numbers.

* * * * *